United States Patent [19]

Aston

[11] 4,239,378
[45] Dec. 16, 1980

[54] PHOTOGRAPHIC PRINTING APPARATUS

[75] Inventor: Keith Aston, Banstead, England

[73] Assignee: Durst (U.K.) Ltd., Epsom, England

[21] Appl. No.: 34,366

[22] Filed: Apr. 30, 1979

[30] Foreign Application Priority Data

May 31, 1978 [GB] United Kingdom ............... 25067/78

[51] Int. Cl.³ ............................................. G03B 27/76
[52] U.S. Cl. ......................................................... 355/35
[58] Field of Search ....................... 355/32, 35, 83, 77, 355/40, 41, 30, 38, 67-71; 354/289

[56] References Cited

U.S. PATENT DOCUMENTS

| 3,561,866 | 2/1971 | Cohen ..................................... 355/35 |
| 3,604,801 | 9/1971 | Young .................................. 355/83 X |
| 3,797,933 | 3/1974 | Sable .................................... 355/77 X |
| 4,005,460 | 1/1977 | Mizukawa ........................ 354/289 X |
| 4,057,346 | 11/1977 | Ellingham et al. ..................... 355/41 |

Primary Examiner—Donald A. Griffin
Attorney, Agent, or Firm—Cahill, Sutton & Thomas

[57] ABSTRACT

A photographic printer is provided with a control unit mounted on the top thereof having a plurality of control switches secured thereto. The controls thus mounted on the control unit are those whose use is normally required in the daily operation of the printer. Selected controls are concealed by the control unit and are accessible only by pivoting the control unit to expose such selected controls. The selected controls relate to those functions which need to be adjusted or set infrequently.

10 Claims, 5 Drawing Figures

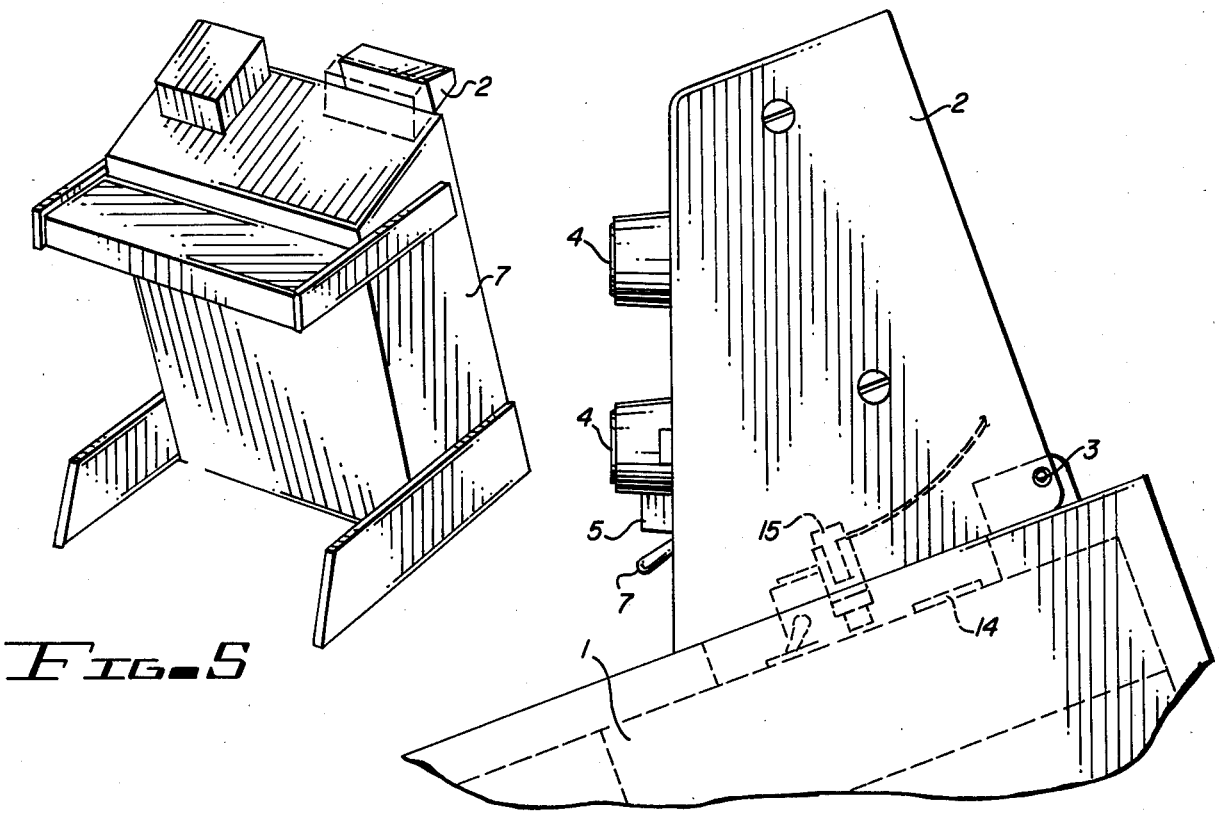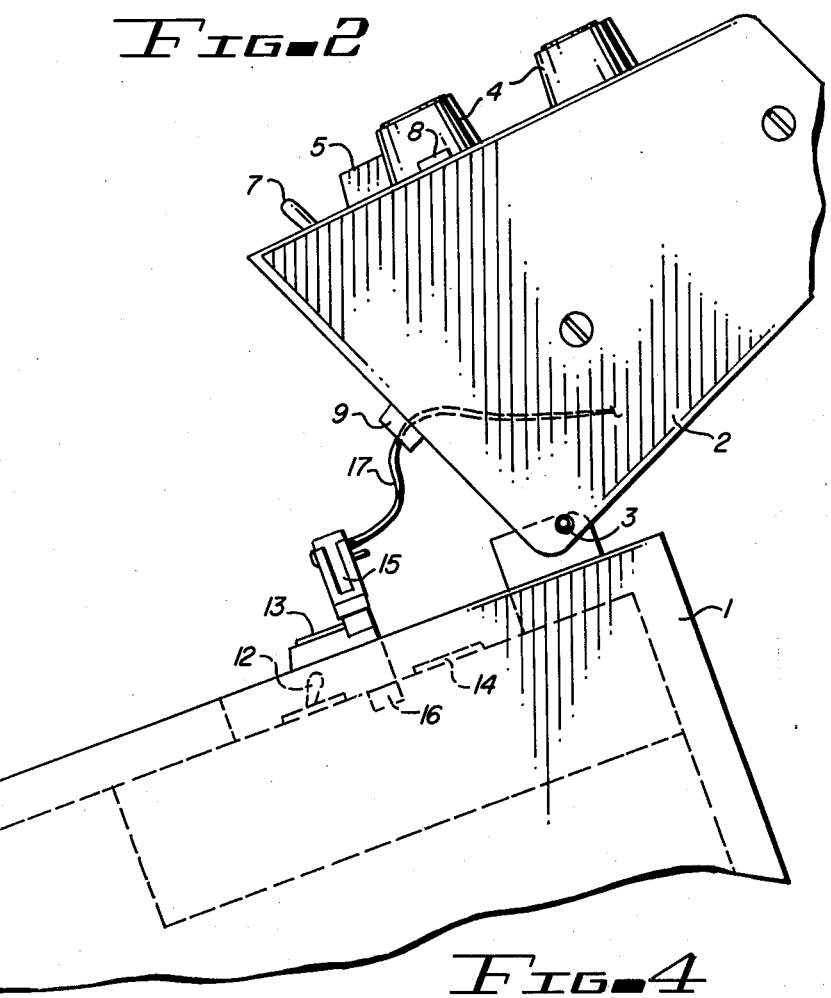

PHOTOGRAPHIC PRINTING APPARATUS

This invention relates to control units for photographic printers. Photographic printers, and especially automatic color printers, tend to have a large number of controls some of which require adjustment much less frequently than others; for example, color balance controls have to be reset only when a new roll of printing paper is loaded into the machine, possibly at intervals of as much as a few weeks. Since these controls must be readily accessible when they are needed, however, they are usually mounted on the main control panel of the machine. This has the serious disadvantage that these preset controls may be inadvertently adjusted in use, at least causing unsatisfactory prints to be produced until the fault is corrected and at worst requiring the controls to be completely reset.

It is therefore an object of this invention to eliminate or reduce the risk of inadvertent operation of selected preset controls in photographic printers by concealing the preset controls when the printer is being used while nevertheless keeping them immediately accessible when required.

It is another object of this invention to provide a photographic printer with a control unit which is pivotally mounted for movement between a first position in which selected controls are concealed between the control unit and the body of the machine, and a second position in which the selected controls are exposed.

It is still another object of the present invention to provide a photographic printer with a control unit which is pivotally mounted for movement between a first position in which selected controls are concealed between the control unit and the body of the machine, and a second position in which all of the controls, including the selected controls, are exposed.

These and other objects of the present invention will become apparent to those skilled in the art as the description thereof proceeds.

Briefly, the present invention provides a means for preventing inadvertent operation of selected controls by rendering such controls inaccessible to the operator during normal operation of a photographic printer. Advantageously, the selected or concealed controls are controls which do not normally require adjustment between making one print and the next, for example, color balance controls; advantageously also the controls which are exposed in the first position of the control units are controls which do commonly need to be adjusted between making one print and the next, for example color bias controls.

Preferably, the control unit is pivotally mounted on top of the printer to swing away from the operator from its first to its second position.

The present invention may be described with reference to the accompanying drawings, in which:

FIG. 2 is a side view of the apparatus of FIG. 1.

FIG. 4 is a side view of the apparatus of FIG. 3.

FIG. 5 is a perspective view of a photographic printer illustrating the positioning of the control unit of FIGS. 1-4 with respect to the overall printer.

Figure 1:
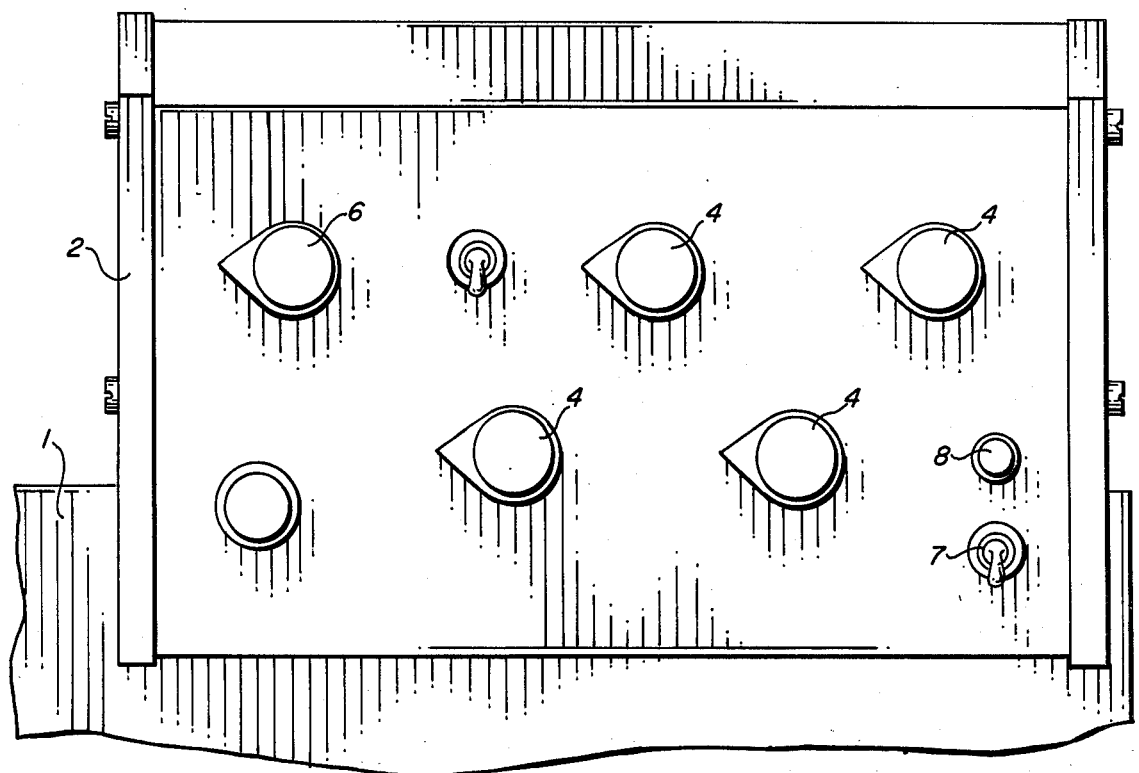
FIG. 1 is a front elevational view of a photographic printer incorporating the teachings of the present invention and showing a control unit in a first operating position.

Referring now to the drawings, the reference numeral 1 indicates generally an automatic color printer, which has a control unit 2 mounted on its top surface by means of pivots 3.

Figure 3:
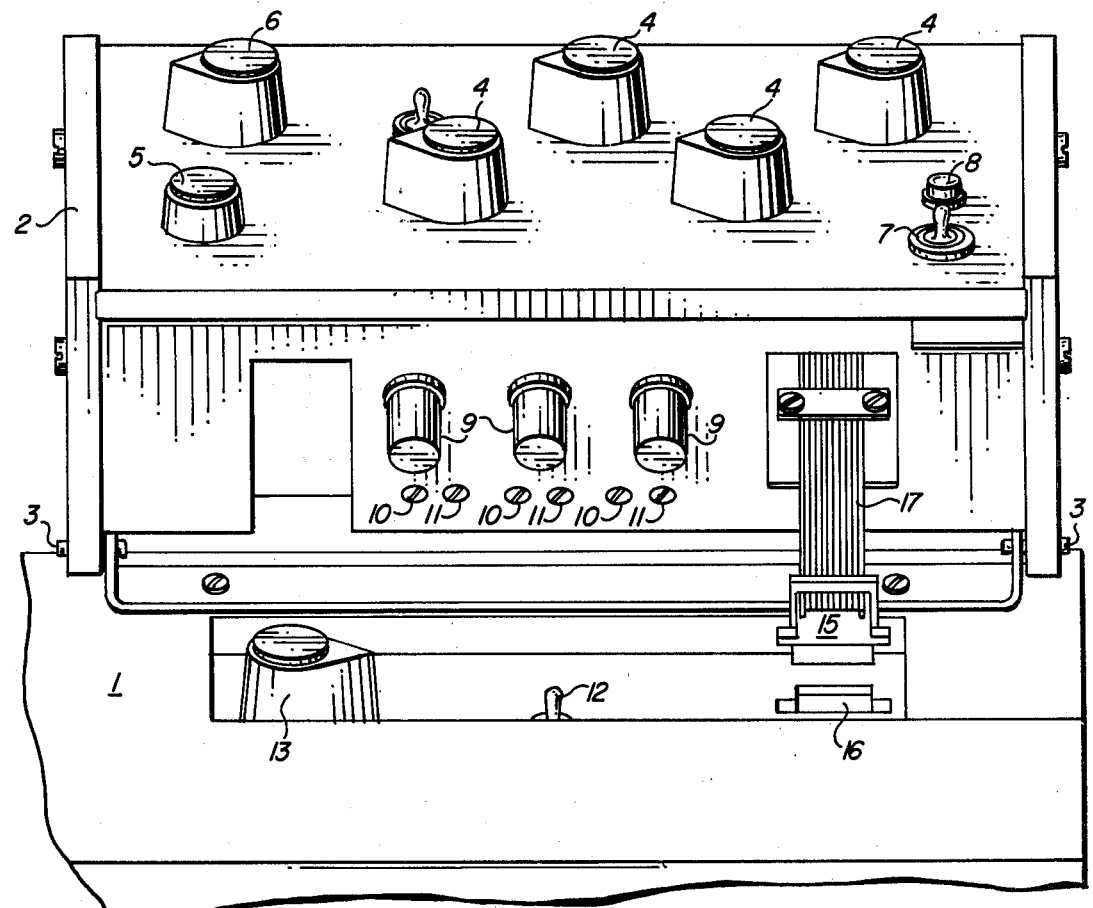
FIG. 3 is a view of the photographic printer of FIG. 1 showing the control unit raised to a second position.

When the printer is in use, the control unit is kept in its operating position (as shown in FIGS. 1 and 2), with those controls that are normally needed, the color and density bias controls 4, the exposure button 5, the size controls 6, the repeat print switch 7 and the paper feed warning light 8 on the front face. Those selected controls which are normally preset are concealed by mounting under the control unit and are exposed only with the control panel in its raised position (as shown in FIGS. 3 and 4). On the underside of the control unit 2 are color balance controls, which are normally reset when a new roll of paper is started. Three channel controls 9, 10 and 11 are provided so that different widths of paper can be used without the controls having to be continually reset. The channel selector (not shown) is on the rear of the unit. In the trough under the control unit are the paper roll head on/off switch 12, the operating mode selector 13, and a DIN socket 14 for a timer or other auxiliary equipment, all of which are used in setting or testing the printer.

The control unit is connected electrically to the printer mechanism by way of a plug 15 and a socket 16 in the trough under the control unit. The connection between the plug 15 and the control unit is flexible and sufficiently slack that the plug will remain in the socket when the control unit is moved between its raised and operating positions.

I claim:

1. A photographic printer having a plurality of controls, a control unit with some of said controls mounted thereon in continuously exposed positions, the control unit being pivotally mounted to the body of the printer for movement between a first position, in which selected controls for the printer are concealed between the control unit and the body of the printer, and a second position, in which said selected controls are exposed.

2. A printer as claimed in claim 1 wherein those controls mounted on said control unit are exposed in the first position of the control unit and are still exposed in the second position.

3. A printer as claimed in claim 1 or claim 2 wherein at least some of the concealed controls are mounted on the control unit.

4. A printer as claimed in claim 3 wherein the concealed controls are controls which are not normally adjusted between making one print and the next but which have to be reset from time to time.

5. A printer as claimed in claim 4 wherein the control unit is mounted on a generally upward facing surface of the printer and is pivoted to swing, upward and away from an operator's position, from its first position to its second position.

6. A printer as claimed in claim 1 or claim 2 wherein at least some of the concealed controls are mounted on the body of the printer.

7. A printer as claimed in claim 6 wherein the concealed controls are controls which are not normally adjusted between making one print and the next but which have to be reset from time to time.

8. A printer as claimed in claim 7 wherein the control unit is mounted on a generally upward facing surface of the printer and is pivoted to swing, upward and away from an operator's position, from its first position to its second position.

9. A printer as claimed in claim 1 or claim 2 wherein the concealed controls are controls which are not normally adjusted between making one print and the next but which have to be reset from time to time.

10. A printer as claimed in claim 1 or claim 2 wherein the control unit is mounted on a generally upward facing surface of the printer and is pivoted to swing, upward and away from an operator's position, from its first position to its second position.

* * * * *